(12) United States Patent
Arellano

(10) Patent No.: US 8,528,933 B1
(45) Date of Patent: Sep. 10, 2013

(54) CONTOUR AIRBAG

(75) Inventor: Nora Arellano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/537,431

(22) Filed: Jun. 29, 2012

(51) Int. Cl.
*B60R 21/16* (2006.01)

(52) U.S. Cl.
USPC ........................................ 280/730.2

(58) Field of Classification Search
USPC ........................................ 280/730.2
See application file for complete search history.

(56) References Cited

U.S. PATENT DOCUMENTS

| | | | |
|---|---|---|---|
| 7,237,802 | B2 | 7/2007 | Rose et al. |
| 7,695,013 | B2 | 4/2010 | Kakstis et al. |
| 2002/0130495 | A1 | 9/2002 | Lotspih et al. |
| 2005/0189747 | A1 * | 9/2005 | Khandhadia et al. ...... 280/730.2 |
| 2008/0048421 | A1 | 2/2008 | Breed et al. |
| 2011/0140401 | A1 | 6/2011 | Fischer et al. |

* cited by examiner

*Primary Examiner* — Faye M. Fleming
(74) *Attorney, Agent, or Firm* — Gifford, Krass, Sprinkle, Anderson & Citkowski, P.C.

(57) ABSTRACT

An airbag is provided that includes one or more creases or knobs within a catch zone that allows automatic positioning of the catch zone upon contact with an occupant. The knob and crease provide for flexible airbag positioning that is automatically adjustable dependent on the location an occupant contacts an airbag, the mass or dimension of an occupant, or position of a vehicle section, so as to provide directional support and guidance for the position of an airbag upon deployment or contact with an occupant.

29 Claims, 2 Drawing Sheets

CONTOUR AIRBAG

FIELD OF THE INVENTION

The invention relates to devices for passive restraint of a vehicle occupant during a collision. More specifically, airbags are provided that include contouring to provide automatic airbag repositioning upon contact with the head or other body part of an occupant improving protective capacity of the airbag.

BACKGROUND OF THE INVENTION

Air bag systems are designed so that the air bag is ideally fully inflated before the occupant contacts the air bag. However, most occupants are not ideally positioned at the location assumed by the air bag system designer. Also, vehicle occupants have greatly varying physical dimensions such as size and weight that complicate airbag positioning during deployment and occupant restraint phases. It is common for many occupants to sit very close to the air bag deployment location(s), which may lead to either ineffective restraint or possible injury from the airbag itself.

For protection against impacts other than from the front of the vehicle, automobiles commonly include airbags that deploy from the side of the occupant. Such airbags are typically deployed from either the upper support of the vehicle or from the occupant's seat. Some airbags, termed side curtain airbags, provide cushioning between vehicle occupant(s) and the doors and windows of a vehicle during a lateral impact. Side curtain airbags can extend from a front pillar (A pillar) all the way to the rear of a vehicle, and in vans or sport utility vehicles the airbags can cover not only the front and second row seats, but may also extend back to a third row of seats. The airbags can extend between any designated set of pillars of the vehicle from the front A pillar, B pillar, C pillar to even the D rear pillar of a vehicle.

Given the numerous positions in which an occupant is expected to be oriented, optimal protection by an airbag is difficult to achieve. Airbags may have a target area or restraint zone intended to contact the occupant when the airbag is deployed. Automatically adjusting the location of this restraint zone, and a catch zone therein, has not yet been adequately achieved. Thus, there is a need for improved airbags that are able to automatically adjust position to most effectively protect an occupant during a collision.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A vehicle airbag including a catch zone, said zone positioned in said airbag so as to be at or proximal to an occupant's head when said airbag is fully deployed; a crease positioned within said catch zone and further extending from at or proximate to an edge of said airbag into the catch zone.

Some embodiments include a knob in addition to or in place of a crease, wherein the knob is positioned within the catch zone, optionally at a terminus of a crease. The airbags provided provide a system that will automatically adjust the airbag positioning and/or cushioning zone to improve occupant protection during a collision.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

The invention has utility for occupant passive restraint in a vehicle. An airbag is provided that includes one or more creases and/or knobs positioned in the airbag fully or partially within a catch zone proximal to an occupant's head when the airbag is deployed. A catch zone is defined herein as a region of an airbag, fully or partially inflatable, intended to contact an occupant or portion thereof during or following deployment of an airbag. It is appreciated that an airbag may include one or more catch zones. As an illustration, an exemplary side airbag optionally includes one catch zone for each area of the airbag that may contact an occupant's head when the airbag is deployed. A side airbag optionally is designed to protect one, two, three, or more rows of passengers, and as such, optionally includes one, two, three, or more catch zones within the airbag.

The term "airbag" is defined herein as a chamber partially or fully filled with a gas that acts as a passive restraint for an occupant of a vehicle. The "air" in an airbag is not limited to air, but may be any suitable gas, as will be recognized by one of skill in the art, illustratively nitrogen, helium, or other suitable gas or mixtures of gasses known in the art, or combinations thereof. While the description is directed to side impact airbags, it is appreciated that the elements of the invention are optionally included in a front airbag, knee airbag, or other airbag as is known in the art.

Figure 1:
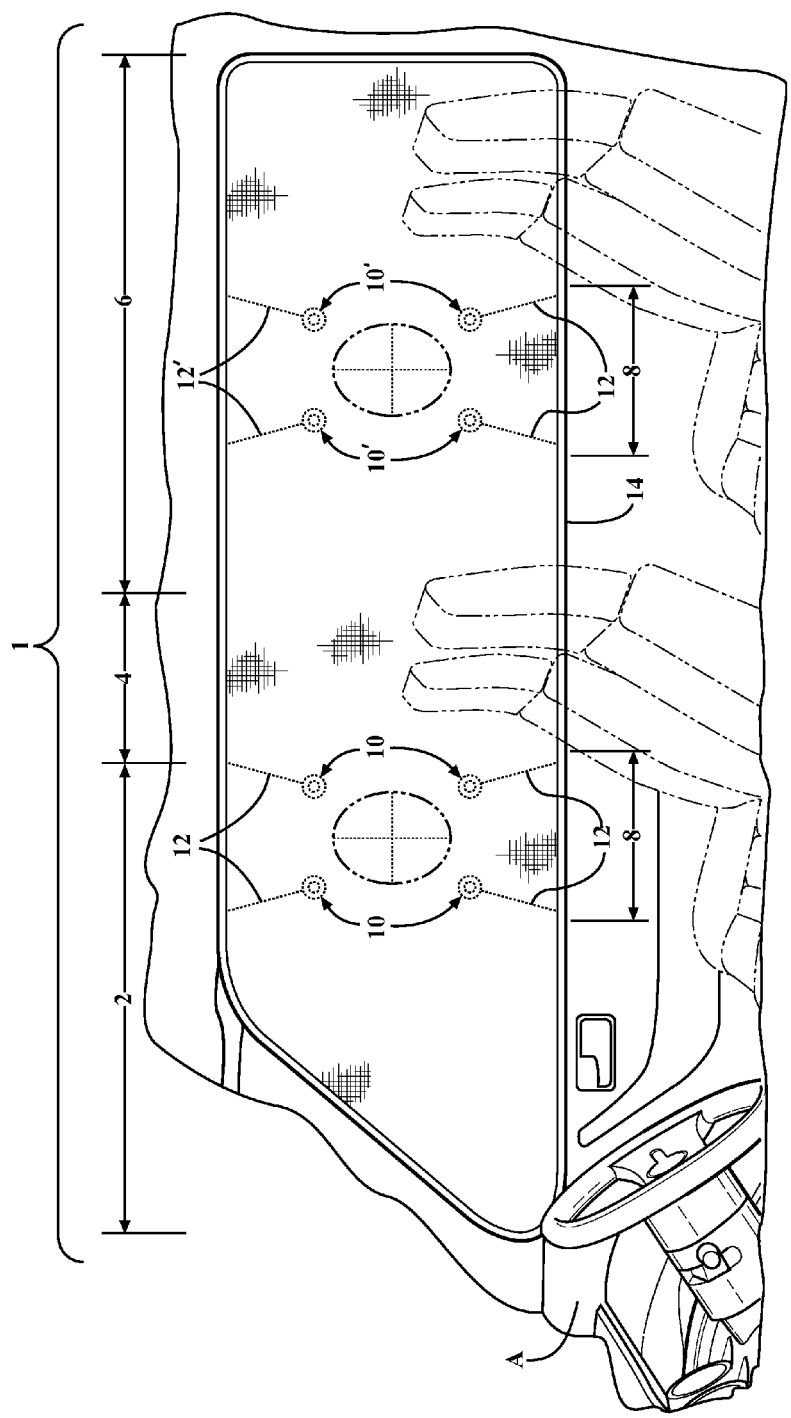
FIG. 1 is an illustration of an airbag according to one embodiment illustrating a knob and a crease that allow automatic repositioning of the airbag upon contact with an occupant.

In one exemplary embodiment of a side impact airbag as depicted in FIG. 1, an airbag 1 is provided that includes a first restraint zone 2, a first pillar section 4, and a first catch zone 8 that is positioned within the first restraint zone 2. The first restraint zone 2 and first pillar section 4 are proximate to one another and in physical contact. The first restraint zone 2 is positioned in the airbag 1 so that an occupant's head will contact the bag within the restraint zone when the airbag is deployed.

An airbag 1 optionally includes more than one restraint zone (illustratively 2, 6), optionally more than one pillar section, and optionally more than one catch zone (illustratively 8, 8'). Optionally, a single restraint zone includes more than one catch zone. Optionally, three or more catch zones are located within a single restraint zone. In the side curtain airbag depicted in FIG. 1, a second restraint zone 6 is present in the airbag proximal to the first pillar section 4 opposite the first restraint zone 2. A second restraint zone 6 is operable to provide passive protection to an occupant in a row of seats different than the row protected by the first restraint zone 2. The second restraint zone 6, or additional restraint zone(s), optionally includes one or more catch zones.

A restraint zone includes one or more catch zones 8, 8'. A catch zone 8 is a region of a restraint zone 2, 6 intended to contact the head of an occupant if the occupant is in an intended position within the vehicle when the airbag is deployed. A catch zone optionally includes a one or more positions, optionally no more than one position, of contacting the head of an occupant. In FIG. 1, a headform is illustrated as an oval with a cross in hatched markings to indicate one or a few possible locations in an airbag for contacting the head of an occupant. One or more catch zones are present in a single restraint zone. In some embodiments, a single restraint zone includes no more than one catch zone.

A catch zone 8 includes one or more surface features that serve to promote changing shape, positioning, or both of an airbag when contacting the head or other area of an occupant. The surface features include a knob 10, 10', a crease 12, 12', or combinations thereof. A knob is positioned within a catch zone of an airbag so as to be at or proximal to an occupant's head when the airbag is fully deployed. The airbag of FIG. 1 illustrates four knobs 10, 10' within each respective catch zone 8, 8'. The number of knobs in FIG. 1 is for illustrative purposes only. Optionally, a single catch zone includes 1, 2, 3, 4, 5, 6, 7, 8, or more knobs. A knob 10, 10' is optionally an elliptical or polygonal shaped depression in the surface of an airbag. A knob optionally traverses the crossectional dimension (depth) of the airbag so as to form a region that is not inflatable. A knob is optionally a circular depression of decreasing radius so as to be substantially conical. A knob optionally has a diameter or cross sectional dimension at the surface of an airbag of 1, 2, 3, 4, 5, 6, 7, 8, 9, 10, 11, 12, 13, 14, 15, 16, 17, 18, 19, 20, 15, 30, or more mm. A knob optionally has a depth from 1 mm to the entire cross sectional depth of an airbag. Optionally, a knob has a depth of 10, 20, 30, 40, 50, 60, 70, 80, 90, 100, 110, 120, 130, 140, 150, 160, 170, 180 190, 200 or more mm. In some embodiments a depth does not exceed 180 mm. Optionally, a depth does not exceed 150 mm. A depth is optionally 130 to 150 mm. A first knob, second knob, or additional knob is optionally of the same or different dimensions. Optionally, all knobs are identically dimensioned.

A knob is optionally placed less than ½ the width of an airbag from an upper or lower edge of the airbag. A knob is optionally placed 5, 10, 15, 20, 25, 30, 35, 40, or 45% of the width of an airbag from the edge of an airbag. A knob is optionally placed from 5 to 45%, or any value or range therebetween of the width of an airbag from the edge of an airbag. The inventors have found that placing a knob proximal to an expected point of contact for the head of an occupant (illustrated in FIG. 1 as a headform) has the greatest benefit for promoting beneficial airbag performance. Optionally, a knob is placed within 1, 2, 3, 4, 5, 6, 7, 8, 9, or 10 mm from an expected point of contact for the head of an occupant.

An airbag 1 optionally includes one or more creases 12, 12' along a face of an airbag. A crease 12, 12' extends from an edge of an airbag to a knob. Each knob is optionally contacted by one or more creases. A crease is a region of an airbag surface that has a shape, material, or other effector that promotes a folding of the airbag at the crease prior to or upon contact with an occupant, optionally the head of an occupant. A crease extends from at or within 20 cm from an edge of an airbag to one or more knobs, optionally terminating at a knob. A crease has a length. A crease length is optionally from 1 cm to 35 cm, or any value or range therebetween. Optionally, a crease has a length of 1 cm to 25 cm.

A crease is optionally formed by sewing the material of an airbag at the point of the crease to promote creasing at the sewing point. In some embodiments, a crease is formed from the airbag material itself such as by weaving a crease shape, or by shaping the airbag material (illustratively a polymeric coating or forming the airbag from the polymeric material itself) to promote creasing at the crease point. A crease is may be uniform in depth, or non-uniform in depth. In some embodiments, a crease is of shallow depth at or near an edge and a deeper in depth toward the middle of the crease, optionally with a deepest depth at one or more points midway along the length of the crease. A crease optionally has the greatest depth at the point where the crease contacts a knob. A crease depth is optionally 0, 1, 2, 3, 4, 5, 6, 7, 8, 9, 10, or more mm. A crease optionally has a depth that is equal to the cross sectional depth of the airbag itself so as to form a non-inflatable crease region of the airbag. In some embodiments, a crease does not extend across the entire depth of the airbag. In some embodiments, a crease is only formed upon contact with the head of an occupant, yet stitching, shaping, or other method of crease promotion is placed at the location of the crease to direct creasing to the crease location upon contact with an occupant.

Each catch zone optionally includes 1, 2, 3, 4, 5, 6, or more creases. In particular embodiments, a catch zone includes 2 or 4 creases. While other crease numbers are operable, four creases is preferable as it most beneficially promotes airbag repositioning around the occupant during contact. Two or more creases are optionally identically dimensioned. Optionally, all creases are identically dimensioned. Optionally, two or more creases are not identically dimensioned. Crease or knob dimensions can be individually tailored to the particular location of the airbag and its relation to one or more locations expected to contact an occupant.

A crease is optionally placed along one face of an airbag complementary to or directly across as similar or identical crease on the opposite face of an airbag. As an example, a first face that is proximal to an occupant includes a crease contacting a knob. The knob optionally traverses the depth of the airbag and contacts a second crease on the opposite face of the airbag that is distal to the occupant. The first crease and the second crease optionally function together to direct airbag positioning or repositioning during deployment. The second crease in these embodiments is thereby positioned to promote the function of the first crease, and vice versa. Each catch zone optionally includes 1, 2, 3, 4, 5, 6, or more pairs of creases with each member of the pair on opposite faces of the airbag. Optionally, a single knob has depth that traverses the depth of the airbag, and a crease associated with the knob that also traverses the depth of the airbag. This configuration also promotes airbag repositioning along both faces of the airbag for optimal protective function.

An airbag optionally includes one or more pillar sections 4. A pillar section is defined as a region of an airbag that is not intended to contact an occupant when an airbag is deployed. A pillar section optionally divides two or more restraint zones in an airbag. A pillar section is optionally not inflatable, or not fully inflatable, such as pillar sections described in U.S. Pat. No. 7,261,316. Such a section is known in the art as a sail section that is traditionally made from one or more layers of material that is not inflated when an airbag is deployed. A pillar section is any geometry, size, or other dimension to reduce the amount of air required to inflate an airbag.

Figure 2:
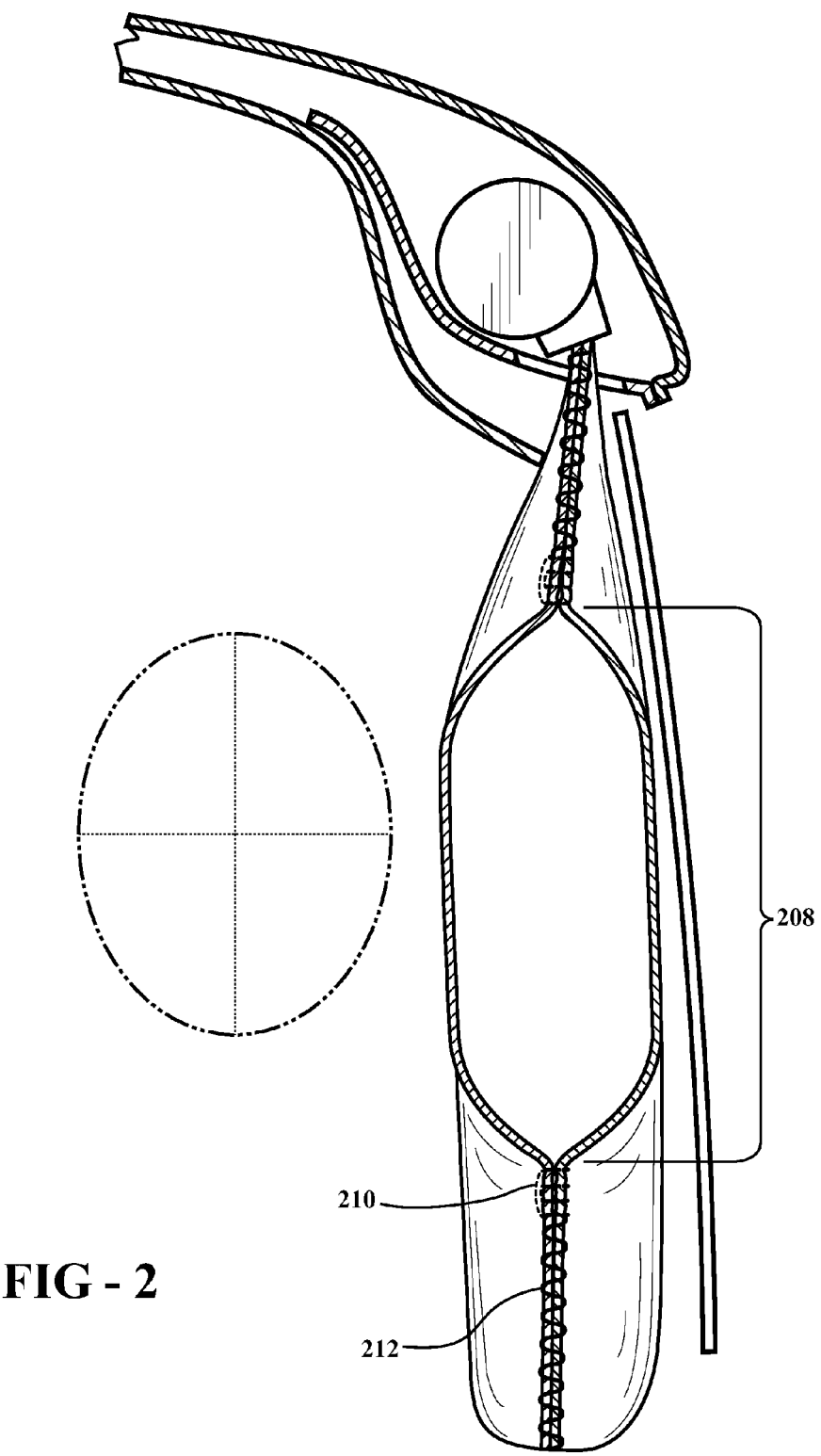
FIG. 2 is a cross sectional illustration of an airbag according to one embodiment illustrating a crease and a knob viewed as a perspective cutaway viewed from the forward end of an airbag.

An alternative embodiment of an airbag 200 is illustrated in FIG. 2 viewed end on from the long edge of a crease 212 within a catch zone 208. The embodiment illustrated in FIG. 2 illustrates a catch zone 208 traversed in part by a crease 212 that has a terminus at a knob 210. The illustration of a single crease and single knob is illustrative only. In these exemplary embodiments, the crease is illustrated with a central depth that is greater than at the knob terminus. The crease 212 is extends from proximal to the edge of an airbag, but sufficiently close thereto to promote airbag positioning or repositioning upon contact with an occupant. The crease 212 is illustrated as formed by stitching that extends the length of the crease. The knob 210 is illustrated as a conical depression in the surface of the airbag with the upper edge of the knob 210 contacting the crease 212. Other embodiments include the crease terminating at the bottom of the knob.

It is appreciated that elements of an airbag described herein can be arranged in numerous configurations. The configurations described herein are for illustrative purposes alone and are not meant to be a limitation on the scope of the invention. Elements of one rigid region, catch zone, pillar section, knob crease, or combinations thereof are illustratively interchangeable with other or additional catch zones, restraint zones, pillar sections, knobs, or creases.

Various modifications of the present invention, in addition to those shown and described herein, will be apparent to those skilled in the art of the above description. Such modifications are also intended to fall within the scope of the appended claims.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A vehicle airbag comprising:
   a catch zone, said zone positioned in said airbag so as to be at or proximal to an occupant's head when said airbag is fully deployed;
   a crease, said crease positioned within said catch zone, said crease further extending from at or proximate to an edge of said airbag into said catch zone, said crease positioned within said airbag so as to direct airbag positioning or repositioning during deployment.

2. The airbag of claim 1 further comprising a knob, said knob positioned within said catch zone at a terminus of said crease opposite said edge.

3. The airbag of claim 1 wherein said air bag further comprises a second catch zone, said second catch zone comprising a second crease.

4. The airbag of claim 3 further comprising a second knob, said second knob positioned within said second catch zone at a terminus of said second crease opposite an edge.

5. The airbag of claim 1 wherein said first catch zone is at a position operable to contact an occupant's head when said airbag is deployed.

6. The airbag of claim 1 wherein said first catch zone is at a front end of said airbag.

7. The airbag of claim 1 wherein said crease is not inflatable.

8. The airbag of claim 2 wherein said knob is not inflatable upon airbag deployment.

9. The airbag of claim 1 wherein said crease is formed within said airbag by stitching a portion of a side of said airbag.

10. The airbag of claim 1 wherein said crease is from 1 centimeter to 25 centimeters in length.

11. The airbag of claim 2 wherein said knob is from 15 millimeters to 50 millimeters in diameter.

12. The airbag of claim 2 wherein said knob has a depth, said depth from 10 millimeters to 200 millimeters.

13. The airbag of claim 1 wherein said crease extends from within 10 centimeters from a lower edge of said airbag.

14. The airbag of claim 2 wherein said knob is located from 5 centimeters to 30 centimeters from said edge of said airbag.

15. A vehicle airbag comprising:
   a catch zone, said zone positioned in said airbag so as to be at or proximal to an occupant's head when said airbag is fully deployed;
   a crease, said crease positioned within said catch zone, said crease further extending from at or proximate to a lower edge of said airbag into said catch zone; and
   a knob, said knob positioned within said catch zone at a terminus of said crease;
   said crease and said knob positioned within said airbag so as to direct airbag positioning or repositioning during deployment.

16. The airbag of claim 15 wherein said air bag further comprises a second catch zone, said second catch zone comprising a second crease and a second knob.

17. The airbag of claim 15 wherein said second knob is positioned at a terminus of said second crease.

18. The airbag of claim 15 wherein said catch zone is at a position operable to contact an occupant's head when said airbag is deployed.

19. The airbag of claim 15 wherein said catch zone is at a front end of said airbag.

20. The airbag of claim 15 wherein said crease is not inflatable.

21. The airbag of claim 15 wherein said knob is not inflatable upon airbag deployment.

22. The airbag of claim 15 wherein said crease is formed within said airbag by stitching a portion of a side of said airbag.

23. The airbag of claim 15 wherein said crease is from 1 centimeter to 25 centimeters in length.

24. The airbag of claim 15 wherein said knob is from 5 millimeters to 30 millimeters in diameter.

25. The airbag of claim 15 wherein said knob has a depth, said depth from 10 millimeters to 200 millimeters.

26. The airbag of claim 15 wherein said crease extends from within 10 centimeters from a lower edge of said airbag.

27. The airbag of claim 15 wherein said knob is located from 5 centimeters to 30 centimeters from the lower edge of said airbag.

28. The airbag of claim 16 wherein said first knob and said second knob are identically dimensioned.

29. The airbag of claim 16 wherein said first crease and said second crease are identically dimensioned.

* * * * *